(12) United States Patent
Toyoda et al.

(10) Patent No.: US 8,152,945 B2
(45) Date of Patent: *Apr. 10, 2012

(54) METHOD FOR PRODUCING DISPLAY DEVICE

(75) Inventors: Tomoyuki Toyoda, Kanuma (JP); Yasumi Endo, Utsunomiya (JP); Yoshihisa Shinya, Utsunomiya (JP); Yusuke Kamata, Utsunomiya (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/656,090

(22) Filed: Jan. 15, 2010

(65) Prior Publication Data

US 2010/0210166 A1   Aug. 19, 2010

Related U.S. Application Data

(63) Continuation of application No. PCT/JP2008/062856, filed on Jul. 16, 2008.

(30) Foreign Application Priority Data

Jul. 17, 2007 (JP) ................................ 2007-186360
Jan. 11, 2008 (JP) ................................ 2008-005027
Apr. 14, 2008 (JP) ................................ 2008-105108

(51) Int. Cl.
*B29C 65/52* (2006.01)
*B29C 73/00* (2006.01)
*B32B 37/00* (2006.01)
*B32B 38/10* (2006.01)
*B32B 43/00* (2006.01)

(52) U.S. Cl. ............. 156/64; 156/94; 156/247; 156/701
(58) Field of Classification Search ................... 156/64, 156/94, 247, 250, 701, 717
See application file for complete search history.

(56) References Cited

U.S. PATENT DOCUMENTS 5,514,294 A * 5/1996 Bohnert et al. ............... 510/411
2004/0180148 A1 * 9/2004 Hieda et al. .................... 428/1.1

FOREIGN PATENT DOCUMENTS

JP   A 06-167681     6/1994
JP   06345499 A  *  12/1994

(Continued)

OTHER PUBLICATIONS

English Abstract of JP 06-345499 (2011).*

(Continued)

*Primary Examiner* — Sing P Chan
(74) *Attorney, Agent, or Firm* — Oliff & Berridge, PLC

(57) ABSTRACT

A method for producing a display device includes: (A) coating a resin composition, which is a raw material of the cured resin, on at least one of the display part or the protective part, (B) closely attaching the display part and the protective part via the resin composition, and (C) arranging the cured resin layer between the display part and the protective part by curing the resin composition by irradiating UV rays from external side of the protective part. After (B), if there is any defect in the resin composition layer, the method further includes (b1) separating the display part and the protective part, and (b2) peeling and removing the resin composition adhered to the separated display part and the separated protective part by a removing solution which contains an organic solvent.

7 Claims, 6 Drawing Sheets

FOREIGN PATENT DOCUMENTS

| | | |
|---|---|---|
| JP | A 07-114010 | 5/1995 |
| JP | A-11-095210 | 4/1999 |
| JP | A 2004-184677 | 7/2004 |
| JP | A 2004-325788 | 11/2004 |
| JP | A 2005-055641 | 3/2005 |
| JP | A-2006-11212 | 1/2006 |
| JP | A 2006-169470 | 6/2006 |
| JP | A 2006-184872 | 7/2006 |
| JP | A-2007-072101 | 3/2007 |

OTHER PUBLICATIONS

Dec. 28, 2010 Office Action issued in Chinese Application No. 200880024747.3 (with translation).

Jul. 5, 2010 Search Report issued in European Application No. 08778207.4.

Office Action issued in related U.S. Appl. No. 12/656,088 dated Jun. 6, 2011.

Dec. 23, 2010 Office Action issued in Chinese Application No. 200880024737.X (English-language only).

Sep. 13, 2010 Search Report issued in European Application No. 08778206.6.

PCT International Preliminary Report on Patentability for Application No. PCT/JP2008/062855; mailed Feb. 9, 2010.

International Search Report for Application No. PCT/JP2008/062856; Mailed Aug. 19, 2008 (with Translation).

* cited by examiner

METHOD FOR PRODUCING DISPLAY DEVICE

This application is a continuation of International Application No. PCT/JP2008/062856 filed Jul. 16, 2008, which claims priority to Japan Patent Application Nos. 2007-186360, filed on Jul. 17, 2007, 2008-005027, filed on Jan. 11, 2008, and 2008-105108, filed on Apr. 14, 2008. The entire disclosures of the prior applications are herein incorporated by reference in their entireties.

BACKGROUND

1. Field of the Disclosure

The present disclosure generally relates to a display device, such as a liquid crystal display device (LCD), used in a cellular phone or the like, for example. In particular, the present disclosure relates to a technology for producing a display device provided with a transparent protective part on a display part.

2. Background of the Disclosure

Conventionally, as this type of display device, a device like that shown in FIG. 7, for example, is known. As shown in FIG. 7, this liquid crystal display device 101 is provided with a transparent protective part 103 formed from, for example, glass or plastic, on a liquid crystal display panel 102. In this case, to protect the surface of the liquid crystal display panel 102 and a polarizing plate (not shown), a gap 105 is formed between the liquid crystal display panel 102 and the protective part 103 by arranging a spacer 104 between the liquid crystal display panel 102 and the protective part 103.

However, the presence of the gap 105 between the liquid crystal display panel 102 and the protective part 103 creates a decrease in contrast and luminance, which attributes to light scattering, and prevents production of a thinned panel.

In view of these problems, it has even been proposed to fill the gap between the liquid crystal display panel and the protective part with a resin (for example, see Japanese Patent Application Laid-Open No. 2005-55641).

In cases where foreign substances or air bubbles are confirmed to have become mixed in the resin which is filled between such a display panel and a protective part, it is necessary to carry out a repair operation by peeling apart the display panel and the protective part.

However, when peeling apart the display panel and the protective part, there is a risk of creating damage such as, resulting from scratching and cracking on the display panel and the protective part.

Furthermore, it is quite difficult to completely remove a cured resin adhered to the display panel and the protective part with a solvent.

In addition, though there are solvents which have high solubility against this kind of cured resin, such solvents have safety problems associated with them. Moreover, in order to completely remove this solvent itself, a separate washing step is required (see, for example, Japanese Patent Application Laid-Open No. 2005-55641).

SUMMARY

A method for producing a display device including a display part for displaying an image and a light-transmitting protective part provided on the display part, where a light-transmitting cured resin layer being arranged between the display part and the protective part is provided. The method for producing a display device according to the embodiments includes the steps of (A) a step of coating a resin composition, which is a raw material of the cured resin, on at least one of the display part or the protective part; (B) a step of closely adhering the display part and the protective part via the resin composition; and (C) a step of arranging the cured resin layer between the display part and the protective part by curing the resin composition by irradiating UV rays from external side of the protective part, wherein, if there is any defect in the display device after the step (B), the method further comprises (b1) a step of separating the display part and the protective part, and (b2) a step of peeling and removing the resin composition adhered onto the separated display part and the separated protective part by a removing solution which contains an organic solvent.

DETAILED DESCRIPTION OF THE DISCLOSURE

Figure 1:
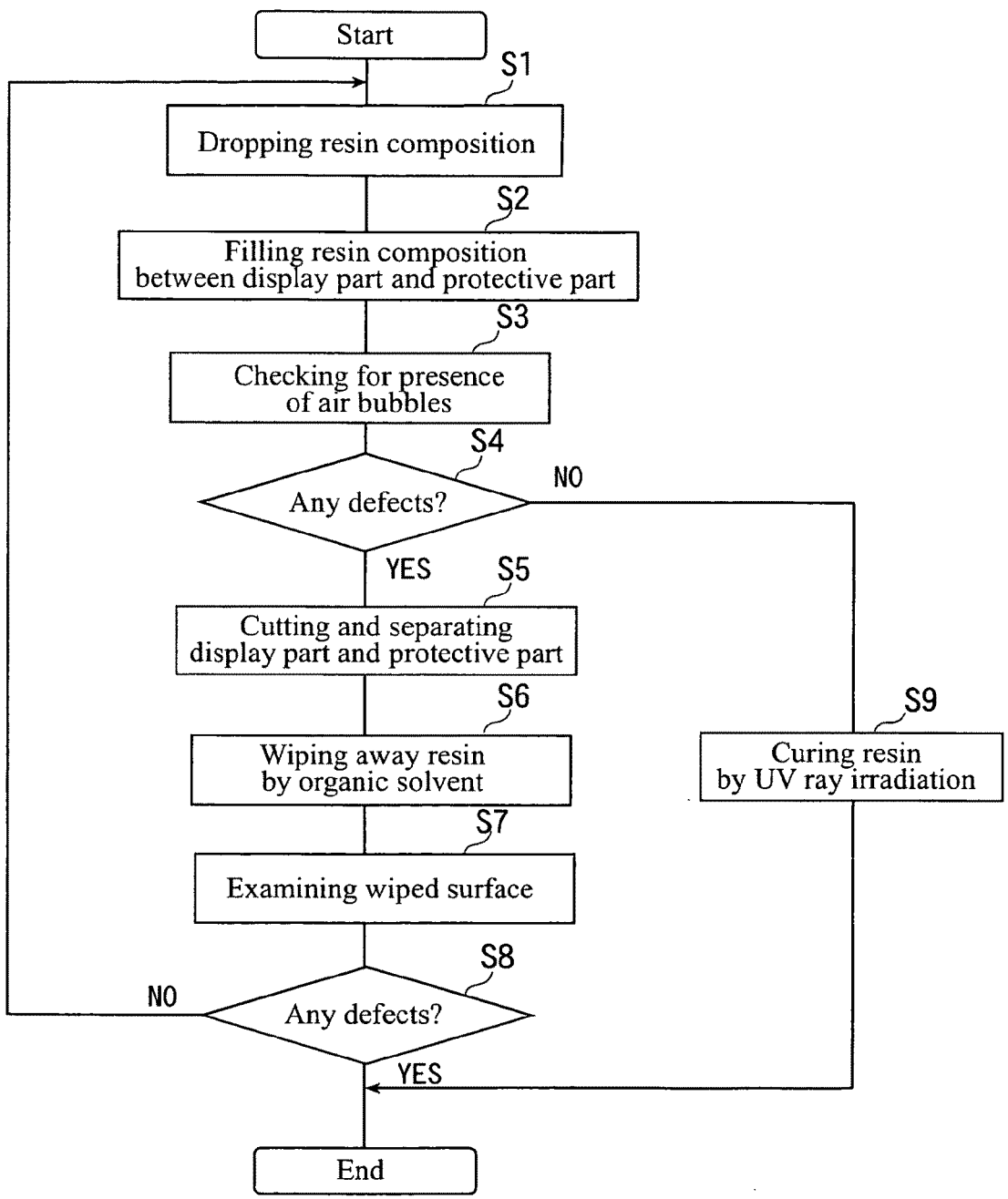
FIG. 1 is a flow diagram illustrating an example of a method for producing a display device according to an embodiment.

The present disclosure was made in consideration of such problems in the conventional art. Accordingly, it is an object of the present disclosure to provide a technology for producing a display device for which a repair operation can be carried out easily and reliably without damage to a display part and a protective part.

In order to achieve the above object, the present disclosure is a method for producing a display device, the display device including a display part for displaying an image and a light-transmitting protective part provided on the display part, wherein a light-transmitting cured resin layer is arranged between the display part and the protective part. The method for producing a display device according to the present disclosure includes the steps of (A) a step of coating a resin composition, which is a raw material of the cured resin, on at least one of the display part or the protective part; (B) a step of closely adhering the display part and the protective part via the resin composition; and (C) a step of arranging the cured resin layer between the display part and the protective part by curing the resin composition by irradiating UV rays from external side of the protective part, wherein, if there is any defect in the display device after the step (B), the method further includes (b1) a step of separating the display part and the protective part; and (b2) a step of peeling and removing the resin composition adhered onto the separated display part and the separated protective part by a removing solution which contains an organic solvent.

In embodiments, according to the above-described aspect, in step (b1), the display part and the protective part are separated coming into contact with a wire having a smaller diameter than a thickness of a resin composition layer from a side of the resin composition layer between the protective part and the display part; and moving the wire through the resin composition layer.

In embodiments, according to the above-described aspect, the organic solvent is selected from a group of organic solvents which are compatible when the resin composition, before curing, and the organic solvent are mixed in a 1:1 volume ratio.

In embodiments, according to the above-described aspect; the removing solution contains limonene or toluene as the organic solvent.

In the embodiments, according to the above-described the removing solution may also contain, in addition to limonene, ethyl alcohol or isopropyl alcohol as the organic solvent.

In an embodiment of the present disclosure, the protective part is formed of a polymer material, and the removing solution contains limonene as the organic solvent.

In the embodiments, the display device can be, for example, a liquid crystal display device in which a polarizing plate is provided on a surface of the display part.

In embodiments, after the display part and the protective part have been closely adhered with the resin composition layer interposed therebetween, if any defects are discovered before the curing of the resin, the display part and the protective part are separated. Furthermore, the resin composition adhered onto the separated display part and the separated protective part is peeled off and removed by a removing solution which contains an organic solvent. Consequently, according to the present disclosure, since a repair operation can be carried out before the curing of the resin, the display part and the protective part do not suffer from damage resulting from, for example, scratching and cracking.

In embodiments, if the display part and the protective part are separated by coming into contact with a wire having a smaller diameter than the thickness of a resin composition layer, from a side face of the resin composition layer where the protective part and the display part are adhered, and moving the wire through the resin composition layer, a procedure for peeling off the display part and the protective part is not conducted during the repair operation. Thus, the display part and the protective part can be separated quickly without causing any damage to the display part and the protective part.

In the embodiments, by selecting an organic solvent which is compatible when the resin composition, before cutting, and the organic solvent are mixed in a 1:1 volume ratio as the organic solvent (for example, limonene or toluene), the resin composition adhered onto the separated display part and the separated protective part is dissolved, thereby carrying out the peeling smoothly and reliably.

In the cases where it is desired, if a removing solvent containing ethyl alcohol or isopropyl alcohol can be used in addition to the organic solvent, such as limonene, the removing solution can improve the peeling properties of the resin composition. In addition, since the volatility of the removing solution increases, the removing solution can also improve operational efficiency.

In embodiments, if step (b2) is carried out using limonene, and then the solvent residue is removed using ethyl alcohol or isopropyl alcohol, the repair operation can be carried out in a state where there is absolutely no residue on the display part and the protective part.

According to the present disclosure, a repair operation can be carried out easily and quickly especially for liquid crystal display device in which a polarizing plate is provided on the surface of a display part.

Thus, according to the present disclosure, a technology can be provided for producing a display device for which a repair operation can be carried out easily and reliably without damage to a display part and a protective part.

Exemplary embodiments of the present disclosure will now be described in more detail with reference to the drawings.

Figure 2:
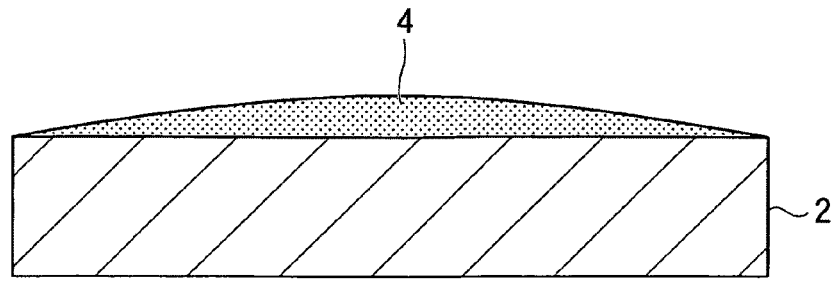
FIGS. 2 (*a*) to (*c*) are cross-sectional views schematically illustrating a method for producing a display device according to an embodiment.
Figure 2:
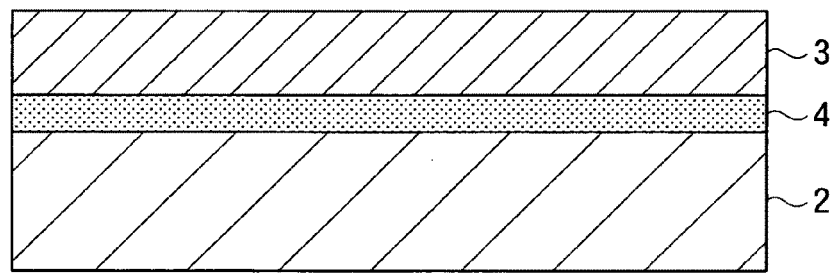
Figure 2:
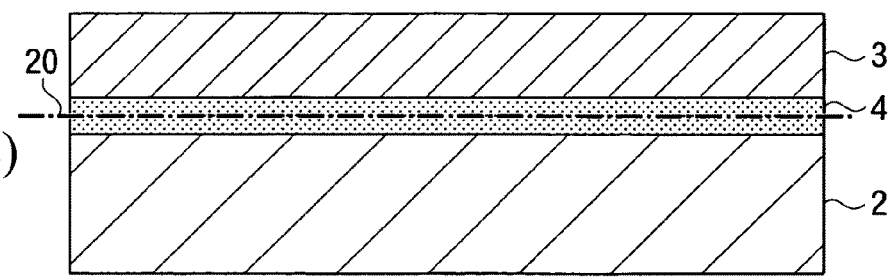

FIG. 1 is a flow diagram for illustrating an example of a method for producing a display device according to the present invention. FIGS. 2 (a) to (c) and FIGS. 3 (a) to (c) are cross-sectional views for schematically illustrating the method for producing a display device according to the present disclosure.

In the embodiment shown in FIG. 2 (a), a resin composition layer 4 is coated and formed by, for example, dropping a photocurable resin composition (hereinafter accordingly called "resin composition", "resin" and the like) in a predetermined amount onto the surface of a display part 2 (step S1).

In the embodiment, this resin composition layer 4 can also be formed by a printing method.

In the embodiment shown in FIG. 2(a), a spacer for determining the distance between the display part 2 and a protective part 3 is not used. In embodiments, the distance between the display part 2 and the protective part 3 is determined by a positioning mechanism (not shown). However, in other embodiments according to the present disclosure, a spacer can be used.

In the case of a liquid crystal display device, a polarizing plate (not shown) is provided on the display part 2. In other embodiments, for example, a light-transmitting glass plate or a substrate formed from a polymer material (plastic) such as an acrylic resin (for example, PMMA: polymethyl methacrylate) may be suitably used as the protective part 3.

Such a protective part 3 is lowered while being kept in a horizontal state. The protective part 3 is then fixed at a predetermined position by a not-shown positioning hoist mechanism. As shown in FIG. 2 (b), the resin composition is placed and filled in a gap between the display part 2 and the protective part 3 (step S2).

In embodiments, a resin composition which has, after curing, a transmittance of 90% or higher, a storage elastic modulus of $4.0 \times 10^7$ Pa or less at 25° C., and a curing shrinkage ratio of 5% or less is used as the photocurable resin composition.

In embodiments, the viscosity of the photocurable resin composition is not especially limited. However, in light of the wet spreading speed and tendency not to run over (surface tension), the photocurable resin composition suitably having a viscosity of 1,000 mPa·s to 5,000 mPa·s, such as 2,000 mPa·s to 3,000 mPa·s can be used.

Specifically, for example, the photocurable resin composition may have a photoreactive acrylate material, such as polyurethane acrylate and isobornyl acrylate; and a photopolymerization initiator as main components; and may include another additive, such as a sensitizing agent, a plasticizer, transparent particles, and the like, within the scope of the object of the present disclosure.

In embodiments, the photopolymerization initiator which includes 1-hydroxy-cyclohexyl-phenyl-ketone (sold under the name of "IRGACURE 184" manufactured by Ciba Specialty Chemicals Inc.) and the like may be suitably used.

The protective part 3 may be provided with a UV-region cutting function in terms of protecting the display part 2 against UV rays. Suitable photopolymerization initiators, used in the present disclosure, include a photopolymerization initiator that can cure the resin composition even in the visible light region (for example, sold under the name of "SPEED-CURE TPO" manufactured by Nihon Siber Hegner KK).

The resin composition in the present disclosure is prepared so that the cured resin obtained by curing the resin composition with UV irradiation has a storage elastic modulus (25° C.) of $4\times10^7$ Pa or less, and preferably of $1\times10^3$ to $1\times10^5$ Pa, a refractive index of preferably of 1.45 or more to 1.55 or less, and more preferably of 1.51 or more to 1.52 or less, and a transmittance of 90% or higher in the visible light region when the cured resin has 100 μm. Even when the main resin components constituting the resin composition are the same, if an additional resin component or monomer component combined to the main resin components is different, the cured resin formed by curing such a curable resin composition may have a storage elastic modulus (25° C.) that exceeds $4\times10^7$ Pa. However, a resin composition that forms such a cured resin is not included in the resin composition according to the present disclosure.

In embodiments, the resin composition is prepared so as to have a curing shrinkage ratio of 5.0% or less, such as 4.5% or less, or in a range of 0 to 2%. Consequently, the internal stress that builds up in the cured resin during curing of the resin composition can be reduced, and the distortion at the interface between the cured resin layer and the display part 2 or the protective part 3 can be prevented.

By arranging the resin composition between the display part 2 and the protective part 3 and then curing the resin composition, the amount of light scattered at the interface between the cured resin layer and the display part 2 or the protective part 3 can be reduced. As a result, the luminance and the visibility of the display image can be improved.

The magnitude of the internal stress that builds up in the cured resin during curing of this resin composition can be evaluated by dropping the resin composition onto a flat plate, curing the dropped resin composition, and measuring the average surface roughness of the resultant cured resin. In practice, the distortion generated at the interface between the display part or the protective part and the resin composition, when the resin composition is arranged between the display part and the protective part and the resin composition is cured, can be ignored if, for example, a cured resin obtained by dropping 2 mg of the resin composition onto a glass plate or an acrylic plate and curing by UV irradiation to a 90% or higher cure ratio has an average surface roughness of 6.0 nm or less. However, according to the resin composition of the present disclosure, this average surface roughness can be kept at 6.0 nm or less, such as 5.0 nm or less, or in the range of 1.0 to 3.0 nm.

With respect to a glass plate, the glass plate for sandwiching the liquid crystals of a liquid crystal cell or the glass plate used as a protective plate for the glass plate or the liquid crystal cell can be used. Furthermore, with respect to an acrylic plate, the acrylic plate used as the protective plate for a liquid crystal cell can be used. These glass plates or acrylic plates usually have an average surface roughness of 1.0 nm or less.

After the above step S2, the presence of foreign substances or air bubbles mixed in the resin composition layer 4 which is filled between the display part 2 and the protective part 3 is checked (step S3).

If, as the result of the check, it is confirmed that there is a defect, such as foreign substances or air bubbles being in the resin composition layer 4 between the display part 2 and the protective part 3 (step S4), the following repair operation is carried out.

In this case, as shown in FIGS. 2 (*c*) and 3 (*a*), the display part 2 and the protective part 3 are separated by cutting the resin composition layer 4 using a wire 20 (step S5).

Figure 4:
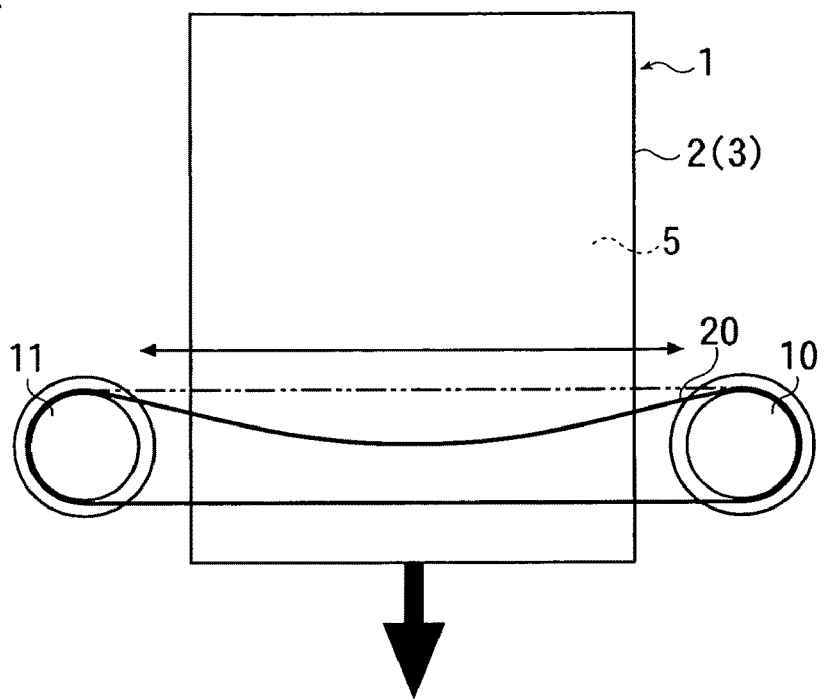
FIG. 4 is an explanatory diagram illustrating an example of a method for cutting a resin composition layer according to an embodiment.
Figure 5:
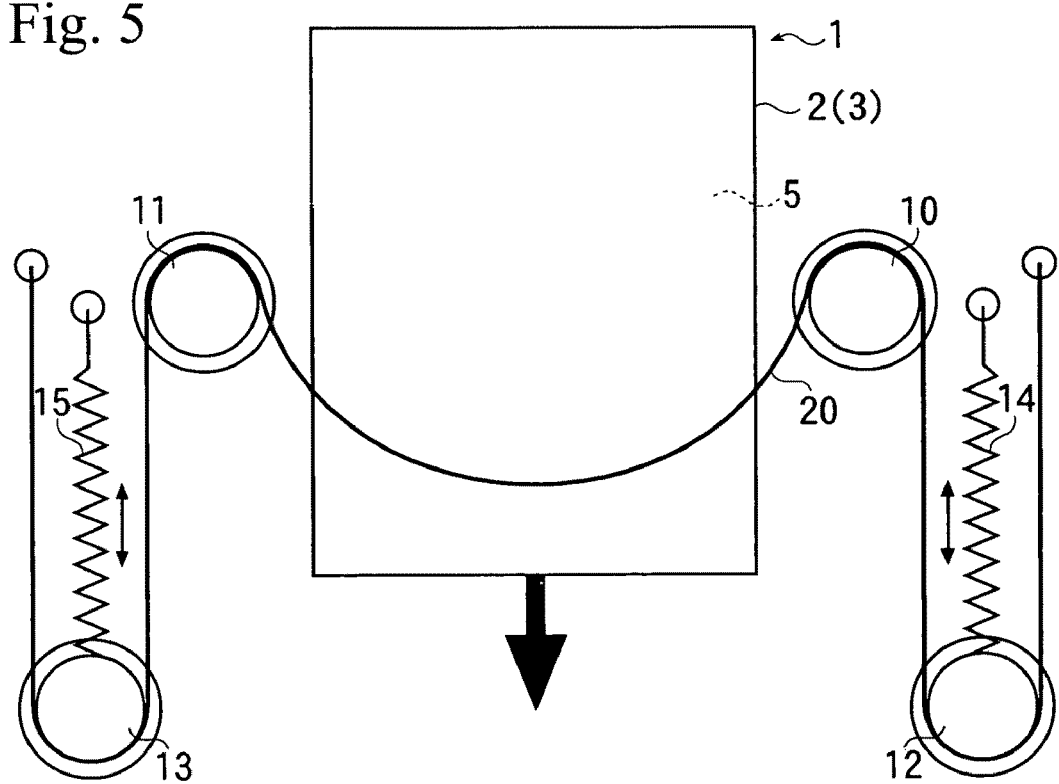
FIG. 5 is an explanatory diagram illustrating another example of a method for cutting a resin composition layer according to an embodiment.

FIGS. 4 and 5 are explanatory diagrams showing examples of a method for cutting a resin composition layer 4 according to the present disclosure.

In the example shown in FIG. 4, the wire 20 is passed over a pair of pulleys 10 and 11. The resin composition layer 4 between the display part 2 and the protective part 3 is pressed against the wire 20 while the wire 20 is slid in a left-right direction as shown in FIG. 4, which is the width direction of the display part 2 and the protective part 3. In this state, the resin composition layer 4 is cut by moving a panel 1 in a direction perpendicular to the wire 20, thereby separating the display part 2 and the protective part 3.

On the other hand, in the example shown in FIG. 5, the wire 20 is passed over a plurality of pulleys 10 to 13 which are arranged so as to constitute a pair of pulley blocks. Furthermore, tension springs 14 and 15, for absorbing slack in the wire 20 between the pulleys 10 and 11, are provided so as to link with each of the pulleys 12 and 13 which move as a pulley block.

In this example, the resin composition layer 4 between the display part 2 and the protective part 3 is pressed against the wire 20. In this state, the resin composition layer 4 is cut by moving the panel 1 in a direction perpendicular to the wire 20, thereby separating the display part 2 and the protective part 3.

In this case, the slack in the wire 20 between the pulleys 10 and 11 is absorbed by the elastic force of the tension springs 14 and 15, so that the wire 20 between the pulleys 10 and 11 is normally in a taut state.

As the wire 20 used in the present disclosure, suitable wires include a metal wire made of carbon steel (for example, piano wire), or the like.

The thickness of the wire 20 is not especially limited, as long as it is less than the thickness of the resin composition layer 4 between the display part 2 and the protective part 3. However, from the perspective of cutting performance, a suitable thickness can be a thickness in the range of 50 μm to 100 μm.

After the display part 2 and the protective part 3 have thus been separated, the resin composition remaining on the surfaces of the display part 2 and the protective part 3 is wiped away by a removing solution containing an organic solvent (step S6).

Figure 6:
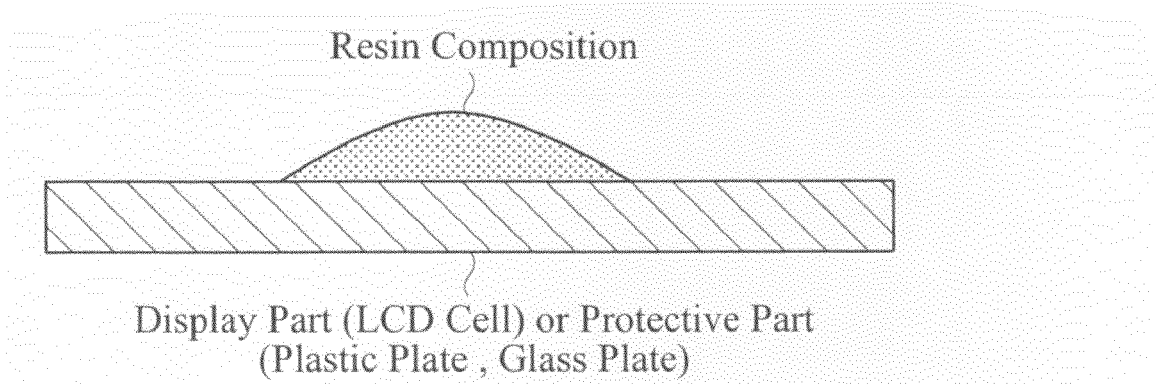
FIGS. 6 (*a*) and (*b*) are explanatory diagrams schematically illustrating a method wiping away a resin composition by an organic solvent.
Figure 6:
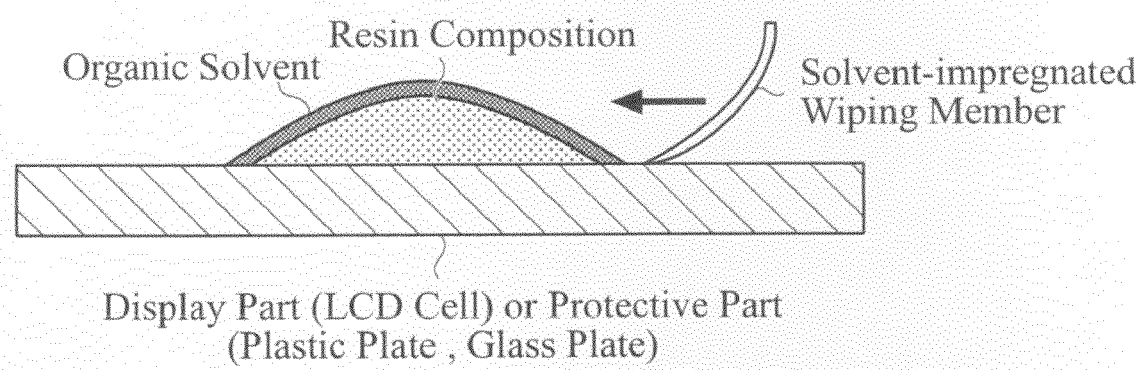
Figure 7:
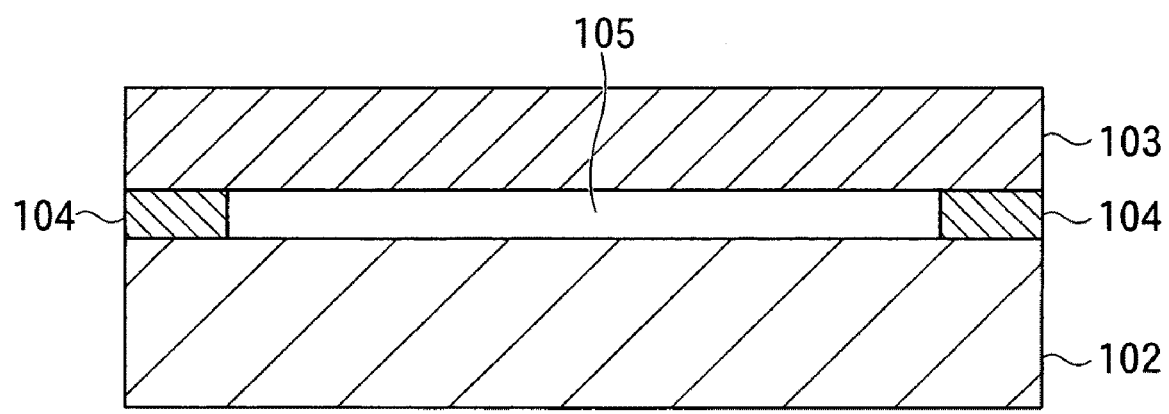
FIG. 7 is cross-sectional view illustrating a configuration of a conventional display device.

FIGS. 6 (*a*) and 6 (*b*) are explanatory diagrams schematically illustrating a method for wiping away a resin composition by an organic solvent.

As shown in FIG. 6 (*a*), the organic solvent-containing removing solution to be described below, is coated by dropping or spraying, for example, onto the resin composition on the display part (for example, LCD cell) or protective part (for example, plastic plate or glass plate).

Furthermore, as shown in FIG. 6 (*b*), the resin composition is wiped away using a wipe member formed of an elastomer or the like which is impregnated with the same solvent as the organic solvent of the removing solution that was coated on the resin composition.

In the embodiments, as the organic solvent contained in the removing solution, an organic solvent which is compatible when the resin composition and the organic solvent are mixed in a 1:1 volume ratio, more specifically, an organic solvent having a small solubility parameter (SP value), can be suitably used. In embodiments, an organic solvent having the solubility parameter of less than 10 can be especially suitably used.

With a removing solution containing such an organic solvent, the resin composition remaining on the surfaces of the display part 2 and the protective part 3 can be removed.

Moreover, for a liquid crystal display device, suitable organic solvents include organic solvents, which do not cause damage, such as changes to the polarizing plate (formed of triacetyl cellulose) provided on the display part 2, for example.

In embodiments, as organic solvents which satisfy the above requirements, include limonene ($C_{10}H_{16}$, solubility parameter: 0.6), toluene ($C_7H_8$, solubility parameter: 8.8), or MEK ($C_4H_8O$, solubility parameter: 9.3).

In light of improvement of the wiping properties and volatility, ethyl alcohol or isopropyl alcohol may be added to the removing solution of the present disclosure.

From the perspective of improving safety, suitable organic solvents include limonene.

When using, as the protective part 3, a substrate formed of a polymer material (especially a PMMA substrate), in embodiments, a suitable organic solvent includes limonene because the resin composition can be wiped away without causing changes to the substrate surface.

Further, if the organic solvent is limonene, the wiping properties and volatility can be improved by adding ethyl alcohol and/or isopropyl alcohol.

Furthermore, after coating the removing solution on the resin composition, the resin composition is wiped away by a wipe member formed of an elastomer or the like which is impregnated with the same organic solvent.

After the above wiping step, the wiped surfaces of the display part 2 and the protective part 3 are examined by, for example, observation of changes in the appearance by a microscope (step S7). If there is no resin composition residue and no changes on the surface have occurred, the process returns to step S1, and the above-described steps are repeated from the start (step S8).

On the other hand, in step S8, if there is a resin composition residue remaining on the surfaces of the display part 2 and the protective part 3, or if surface changes have occurred, the produced display device is treated as a defective product, for example.

Depending on the organic solvent contained in the removing solution, there may be a slight solvent residue. In such a case, it is suitable to carry out a post-washing with a solvent such as ethanol or the like, for example, which does not have an effect on the display part 2 or the protective part 3.

Figure 3:
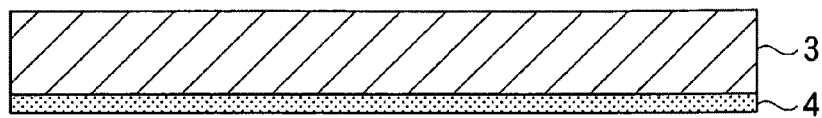
FIGS. 3 (*a*) to (*c*) are cross-sectional views schematically illustrating a method for producing a display device according to an embodiment.
Figure 3:
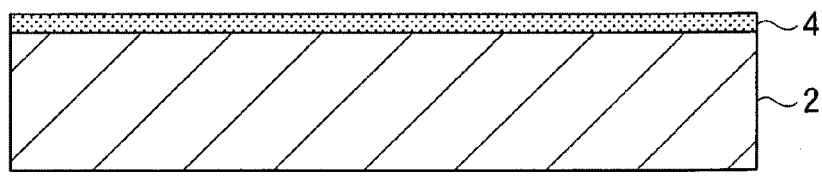
Figure 3:
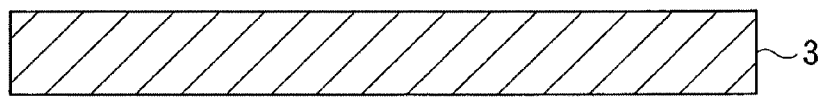
Figure 3:
Figure 3:
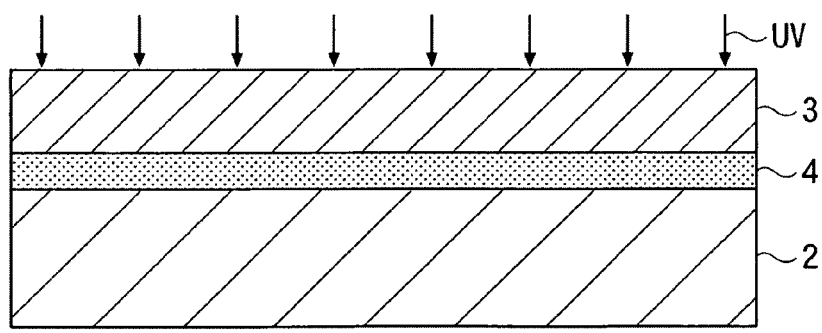

On the other hand, in the above-described step S4, if it is determined that foreign substances or air bubbles are not mixed in the resin composition layer 4 which is filled between the display part 2 and the protective part 3, the process proceeds to step S9. In the step S9, as shown in FIG. 3 (c), for example, the resin composition is cured by irradiating UV rays via the protective part 3 on the resin composition layer 4.

In the present disclosure, the irradiation direction of the UV rays is not especially limited. However, in order to achieve more uniform curing of the resin, it is suitable to irradiate UV rays in the direction perpendicular to the surface of the protective part 3 of the display part 2.

Furthermore, UV rays may also be simultaneously directly irradiated from the external side face of the resin composition layer 4 between the display part 2 and the protective part 3, using an optical fiber or the like, for example.

The present disclosure is not limited to the above-described embodiment, and various modifications can be made thereto.

For example, in the above-described embodiment, the display device was moved against the wire when cutting the resin composition layer. However, the present disclosure is not limited to this. The wire may be moved against the display device.

In the present disclosure, since a repair operation is carried out before the resin is cured, the display part and the protective part can also be separated by pulling them apart during the repair operation.

In addition, the present disclosure is not limited to the above-described liquid crystal display device. For example, the present disclosure may also be applied to various flat panel displays, such as an organic EL device.

Embodiments

The present disclosure will now be described in more detail using the following embodiments and comparative examples. However, the present disclosure is not limited to the following.

[Preparation of Coating Solution]

A resin composition was prepared by kneading in a kneader 70 parts by weight of an ester compound formed of a maleic anhydride adduct of a polyisoprene polymer and 2-hydroxyethyl methacrylate, 30 parts by weight of dicyclopentenyl oxyethyl methacrylate, 10 parts by weight of 2-hydroxybutyl methacrylate, 30 parts by weight of a hydrogenated terpene resin, 140 parts by weight of a butadiene polymer, 4 parts by weight of a photopolymerization initiator, and 0.5 parts by weight of a visible light region photopolymerization initiator.

As shown in FIG. 6 (a), this resin composition was coated on a 100 μm-thick white glass plate to be used as a protective part or glass plate for an LCD cell to be used as a display part.

Then, as shown in FIG. 6 (b), limonene, toluene, or MEK was coated onto the resin composition as an organic solvent.

The resin composition was then wiped away using a wipe member impregnated with the same solvent as the organic solvent coated on the resin composition.

Subsequently, the wiping properties of each sample were confirmed using a microscope to observe changes in the appearance. These results are shown in Table 1.

In Table 1, samples which could be wiped without any problems in their appearance are marked with a "circle", while samples on which a slight amount of organic solvent was left are marked with a "triangle".

TABLE 1

Test Results of Wiping Properties of Resin Composition

|  | Limonene | Toluene | M E K |
| --- | --- | --- | --- |
| Glass Plate | ○ | ○ | ○ |
| LCD Cell | Δ | ○ | ○ |

It is clear from Table 1 that, for the glass plate serving as a protective part, when limonene, toluene, or MEK was used as the organic solvent, the wiping could be carried out without problems in appearance.

However, for the glass plate for an LCD cell to be used as a display part, although the resin composition could be wiped away when limonene was used as the organic solvent, a solvent residue was confirmed on the glass plate for an LCD cell. It was confirmed that this solvent residue was removed by ethanol without affecting the polarizing plate of the LCD cell.

<Cured Resin Physical Properties after Wiping Step>
[Transmittance and Modulus of Elasticity]

The above-described resin composition was dropped onto the above-described glass plate for a protective part for which the wiping step was finished. The plate was transported by a UV-conveyor into a UV-ray irradiation apparatus and then the resin was cured (thickness of the cured resin was 100 μm).

The transmittance of this cured resin was measured using a UV-Visible Spectrophotometer (V-560, JASCO Corporation) and the measurement result was 90% or higher.

Next, using a viscoelastometer (DMS6100, Seiko Instruments Inc.), the modulus of elasticity (measurement frequency 1 Hz, 25° C.) of the cured resin was measured and the measurement result was $1.0 \times 10^4$ Pa.

[Curing Shrinkage Ratio]

For the curing shrinkage ratio, specific gravities of the resin solution before curing and the cured solid product after curing was measured by an electronic densimeter (sold under the name of "SD-120L" manufactured by Mirage) and the curing shrinkage ratio was calculated by the following equation based on the difference of the specific gravities between the resin solution before curing and the cured solid product after curing. The curing shrinkage ratio was 1.8%.

Curing shrinkage ratio (%)=(Cured product specific gravity−Resin solution specific gravity)/Cured product specific gravity×100

[Surface Roughness Measurement]

2 mg of the above resin composition was dropped onto the above-described glass plate for an LCD cell. The distortion (Ra: average surface roughness) in a given region (2.93 mm×2.20 mm) of the glass plate surface due to the internal stress generated during the curing reaction by the UV irradiation was measured by a three-dimensional non-contact surface roughness meter (manufactured by Zygo K.K.) and the measurement result was 2.7 nm.

Thus, in the present example, the cured resin had a modulus of elasticity of 1×104 Pa and a curing shrinkage ratio of 1.8%. Consequently, the average surface roughness Ra was 2.7 nm, and the good results were obtained that there was hardly any distortion.

Based on these results, according to the present disclosure, a repair operation can be carried out easily and reliably without damage to the display part and the protective part. It is thus understood that a display device which is free from distortion can be obtained in a good yield.

What is claimed is:

1. A method for producing a display device including a display part for displaying an image and a light-transmitting protective part provided on the display part, a light-transmitting cured resin layer being arranged between the display part and the protective part, the method comprising the steps of:
   (A) coating a resin composition, which is a raw material of the cured resin, on at least one of the display part or the protective part;
   (B) closely adhering the display part and the protective part via the resin composition; and
   (C) arranging the cured resin layer between the display part and the protective part by curing the resin composition by irradiating UV rays from an external side of the protective part,
   wherein, if there is any defect in the display device after the step (B), the method further includes (b1) separating the display part and the protective part by moving a slack wire through the resin composition, and (b2) peeling and removing the resin composition adhered onto the separated display part and the separated protective part by a removing solution which contains an organic solvent.

2. The method for producing a display device according to claim 1, wherein, in the step (b1), the display part and the protective part come into contact with the slack wire from a side of the resin composition layer between the protective part and the display part, the wire having a smaller diameter than a thickness of the resin composition layer.

3. The method for producing a display device according to claim 1, wherein the organic solvent is compatible with the resin composition when the resin composition before curing and the organic solvent are mixed in a 1:1 volume ratio.

4. The method for producing a display device according to claim 1, wherein the organic solvent is selected from the group consisting of limonene or toluene.

5. The method for producing a display device according to claim 4, comprising, after carrying out the step (b2) using limonene, removing solvent residue using ethyl alcohol or isopropyl alcohol.

6. The method for producing a display device according to claim 1, wherein the protective part is formed of a polymer material, and the removing solution contains limonene as the organic solvent.

7. The method for producing a display device according to claim 1, wherein the display device is a liquid crystal display device in which a polarizing plate is provided on a surface of the display part.

* * * * *